United States Patent
Yoshida

(10) Patent No.: US 9,316,233 B2
(45) Date of Patent: Apr. 19, 2016

(54) PROPELLER FAN AND MANUFACTURING METHOD THEREOF

(75) Inventor: Shunzen Yoshida, Kanagawa (JP)

(73) Assignee: Fujitsu General Limited, Kanagawa (JP)

( * ) Notice: Subject to any disclaimer, the term of this patent is extended or adjusted under 35 U.S.C. 154(b) by 523 days.

(21) Appl. No.: 13/810,182

(22) PCT Filed: Jul. 12, 2011

(86) PCT No.: PCT/JP2011/065895
§ 371 (c)(1),
(2), (4) Date: Jan. 14, 2013

(87) PCT Pub. No.: WO2012/008454
PCT Pub. Date: Jan. 19, 2012

(65) Prior Publication Data
US 2013/0108461 A1 May 2, 2013

(30) Foreign Application Priority Data
Jul. 15, 2010 (JP) .................. 2010-160959

(51) Int. Cl.
*F04D 29/26* (2006.01)
*F04D 29/32* (2006.01)
*F04D 29/38* (2006.01)
(Continued)

(52) U.S. Cl.
CPC ............ *F04D 29/26* (2013.01); *B29C 45/0005* (2013.01); *B29C 45/0046* (2013.01); *F04D 29/023* (2013.01); *F04D 29/329* (2013.01); *F04D 29/388* (2013.01);
(Continued)

(58) Field of Classification Search
CPC ... B29C 45/005; B29C 45/0046; F04D 29/39; F04D 29/384; F04D 29/386; F04D 29/388
USPC ................ 249/204; 264/412; 416/223 R, 234
See application file for complete search history.

(56) References Cited

U.S. PATENT DOCUMENTS

2005/0238486 A1 10/2005 Stagg et al.
2006/0150618 A1* 7/2006 Lehmann et al. ............... 60/289
(Continued)

FOREIGN PATENT DOCUMENTS

CN 85106542 A 3/1987
CN 1364688 A 8/2002
(Continued)

OTHER PUBLICATIONS

English translation of the Written Opinion of the International Searching Authority issued in International Patent Application No. PCT/JP2011/065895 dated Oct. 11, 2011.
(Continued)

*Primary Examiner* — Igor Kershteyn
*Assistant Examiner* — Woody A Lee, Jr.
(74) *Attorney, Agent, or Firm* — McDermott Will & Emery LLP

(57) ABSTRACT

A propeller fan molded by injection molding using a resin material containing a continuous fiber, includes a hub having an end surface wall and a peripheral wall; and a plurality of blades on an outer periphery of the hub, the propeller fan being molded by providing a plurality of injection positions for injecting the resin material containing the continuous fiber in a part of the end surface wall corresponding to a root portion of one of the blades of the hub.

1 Claim, 5 Drawing Sheets

(51) Int. Cl.
- *F04D 29/02* (2006.01)
- *F04D 29/64* (2006.01)
- *B29C 45/00* (2006.01)
- *B29C 45/27* (2006.01)
- *B29K 105/12* (2006.01)
- *B29L 31/08* (2006.01)

(52) U.S. Cl.
CPC .......... *F04D 29/646* (2013.01); *B29C 45/2708* (2013.01); *B29K 2105/12* (2013.01); *B29L 2031/087* (2013.01)

(56) References Cited

U.S. PATENT DOCUMENTS

| | | | |
|---|---|---|---|
| 2007/0104581 | A1 | 5/2007 | Stagg et al. |
| 2011/0200445 | A1* | 8/2011 | Takeda et al. ............. 416/223 R |

FOREIGN PATENT DOCUMENTS

| | | | |
|---|---|---|---|
| CN | 1580579 | A | 2/2005 |
| CN | 101548081 | A | 9/2009 |
| CN | 101670643 | A | 3/2010 |
| JP | 1-105795 | | 7/1989 |
| JP | 5-73295 | | 10/1993 |
| JP | 7-158592 | A | 6/1995 |
| JP | 2000-161295 | A | 6/2000 |
| JP | 3861539 | B2 | 12/2006 |
| JP | 3928380 | | 3/2007 |
| JP | 2010-101227 | A | 5/2010 |
| WO | WO 2010047001 | A1 * | 4/2010 .............. F04D 29/38 |

OTHER PUBLICATIONS

Written Opinion of the International Searching Authority issued in International Patent Application No. PCT/JP2011/065895 dated Oct. 11, 2011.

Chinese Office Action issued in corresponding Chinese Patent Application No. 201180034380.5 on Dec. 31, 2014; 5 pages in Chinese language.

* cited by examiner

RESIN INJECTION

PROPELLER FAN AND MANUFACTURING METHOD THEREOF

RELATED APPLICATIONS

This application is the U.S. National Phase under 35 U.S.C. §371 of International Application No. PCT/JP2011/065895, filed on Jul. 12, 2011, which in turn claims the benefit of Japanese Application No. 2010-160959, filed on Jul. 15, 2010, the disclosures of which Applications are incorporated by reference herein.

FIELD

The present invention relates to a propeller fan manufactured by injection molding of a resin material and a manufacturing method thereof, and more specifically, to a propeller fan with high durability, and a manufacturing method thereof.

BACKGROUND

In the related art, as a propeller fan that is included in an outdoor unit of an air conditioner, an air cleaner, a ventilator or the like and is used for fluid feeding of air or the like, it has been known a propeller fan formed, using a fiber reinforced plastic (FRP) in which a glass fiber or the like is mixed with a thermoplastic resin such as an acryl resin at a predetermined rate (for example, 30 weight %), through an injection molding by setting molding conditions such as an injection pressure and a metal mold temperature to predetermined values.

FIG. 5 illustrates a general injection molding machine 110 that is used for the injection molding of the above-mentioned propeller fan. The injection molding machine 110 includes an injection unit 111 that melts a resin material serving as a material in order to inject the resin material, a metal mold 112 that molds the molten resin from the injection unit 111, a mold opening and closing mechanism 113 that closes the metal mold 112 after molding, and a projection mechanism 114 that projects the molded article to release the molded article from the mold after opening the mold.

Next, a molding machining sequence using the metal mold 112 will be described based on FIGS. 6 to 8. As illustrated in FIG. 6, the metal mold 112 is a three piece type metal mold including a stationary mold 121, a mobile mold 122, and an intermediate metal mold 123 located between both of them, and a plurality of projection pins 124 driven by the projection mechanism 114 is placed on a back side of the mobile mold 122.

Moreover, in a state of joining the stationary mold 121, the mobile mold 122 and the intermediate metal mold 123 at a predetermined clamping pressure, the molten resin is injected from the injection unit 111 into a cavity, not illustrated, formed between the mobile mold 122 and the intermediate metal mold 123 through a runner, not illustrated, formed throughout the stationary mold 121 and the intermediate metal mold 123, and thereby a molded article corresponding to an internal surface shape of the cavity is formed.

FIG. 7 illustrates a state of mutually separating the stationary mold 121, the mobile mold 122 and the intermediate metal mold 123 after molding to open the mold. Due to the opening of the mold, a molded article 116 molded in the cavity remains in a state of being attached to a molding surface of the mobile mold 122, and a runner portion 117 solidified in the runner remains in a state of being attached to the stationary mold 121 side.

In a state of opening the metal mold 112, as illustrated in FIG. 8, the projection pins 124 are caused to advance, the molded article 116 is separated from the mobile mold 122 by the projection pins 124, and the runner portion 117 is separated from the stationary mold 121. The molded article 116 manufactured in this manner is a propeller fan 101 serving as a molding object illustrated in FIG. 3. Furthermore, the injection molding state of the propeller fan 101 in the metal mold 112 is illustrated in FIG. 4.

As illustrated in FIG. 3, the propeller fan 101 has a peripheral wall 105 and an end surface wall 106, and includes a hub 102 which is approximately cylindrical with a bottom provided with a boss 104 for inserting a driving shaft of a motor, not illustrated, configured to rotate the propeller fan 101 in a central portion of the end surface wall 106, and three blades 103 having the same shape integrally attached onto the peripheral wall 105 of the hub 102. As mentioned above, the propeller fan 101 is manufactured by the injection molding using the injection molding machine 110 including the metal mold 112 illustrated in FIG. 4.

As illustrated in FIG. 4, when joining the mobile mold 122 with the intermediate metal mold 123, a cavity 127 is formed between the mobile mold 122 and the intermediate metal mold 123. Furthermore, when joining the stationary mold 121 with the intermediate metal mold 123, a runner 128 for supplying the molten resin injected from an injection nozzle 111a of the injection unit 111 to the cavity 127 is formed between the stationary mold 121 and the intermediate metal mold 123.

Furthermore, the shape of the cavity 127 is set so that a molding surface 125 of the mobile mold 122 side forms a positive pressure surface 103a of the blade 103, and a molding surface 126 of the intermediate metal mold 123 forms a negative pressure surface 103b of the blade 103 in consideration of mold release characteristics of the hub 102. Furthermore, as illustrated in FIG. 3, the runner 128 forms a three-pronged branched road shape corresponding to the number of the blades 103 of the propeller fan 101, and a downstream end of each branched road of the runner 128 is a gate 129 serving as an injection hole of the molten resin into the cavity 127.

Thus, the molten resin is injected into the cavity 127 through the runner 128 from the injection nozzle 111a at a predetermined injection pressure, the cavity 127 is filled with the molten resin, and thereby the propeller fan 101 having a shape corresponding to the inner surface shape of the cavity 127 is molded.

At this time, the runner portion 117 having a shape corresponding to the inner surface shape of the runner 128 is molded in the runner 128 by the molten resin supplied thereto, and the runner portion 117 is integrally connected to the propeller fan 101 by each gate 129. The propeller fan 101 and the runner portion 117 are cut and separated by each gate 129 when the metal mold 112 is opened. Thus, as illustrated in FIG. 3, cutting traces in the runner portion 117, that is, three gate marks 118 remain on the end surface wall 106 of the propeller fan 101 after the molding.

However, in general, since the shape of the blade of the propeller fan greatly affects the blowing performance, the shape is designed under extremely exact calculations, and thus there is a need to pay a close attention so as to obtain the shape of the blade corresponding to the design shape, particularly when manufacturing the propeller fan.

For example, when setting the gate 129 of the runner 128 to a position corresponding to a blade surface (the negative pressure surface 103b illustrated in FIG. 4) of the blade 103 of the cavity 127, the gate marks 118 remain on the blade surface of each blade 103 of the molded propeller fan 101, the blade surface becomes uneven due to the presence of the gate marks 118, the blade surface shape is different from the design shape, and thus the blowing performance may decline.

Thus, in the related art, generally, as illustrated in FIGS. 3 and 4, each gate 129 is set to a position corresponding to a root of the blade 103 of the peripheral wall 105 on the end surface wall 106 of the hub 102 while avoiding the provision thereof on the blade 103 side.

Furthermore, the shape of the propeller fan of the related art and the manufacturing method thereof mentioned above is, for example, described in the description of the related art in Patent Literature 1.

However, in the propeller fan of the related art mentioned above, the number of the gates 129 at the time of the injection molding is one with respect to each blade 103, as illustrated in FIG. 9, the molten resin that flowed into the cavity 127 from the gate 129 flows like the flow of the resin indicated by reference numeral 400.

Specifically, the molten resin that flowed into the cavity 127 from the gate 129 flows so as to spread in the cavity 127 from the gate 129, and flows like the flow 400 (400a to 400f) of the resin illustrated in FIG. 9. Although the blade 103 is jointed to the peripheral wall 105 of the hub 102 by a root portion 200, as illustrated in FIG. 4, a thickness from a root portion 200 to the leading end portion of the blade 103 becomes thinner toward the leading end portion of the blade 103 from the root portion 200.

The molten resin that flowed from the gate 129 initially reaches the root portion 200 just below the gate 129 (the gate mark 118). The molten resin that reaches this then flows in a direction along the root portion 200, that is, like the flows 400a and 400b of the resin illustrated in FIG. 9 before flowing in the direction of the blade 103 for a difference in thicknesses from the above-mentioned root portion 200 to the leading end portion of the blade 103. Moreover, the molten resin that reached the root portion 200 by other courses is pressed into the flows 400a and 400b of the resin, and flows in a direction along the root portion 200 like the flows 400c to 400f of the resin illustrated in FIG. 9.

The molten resin is a fiber reinforced plastic, and includes a continuous fiber 300. However, since the orientation direction of the continuous fiber 300 is parallel to the flow of the resin, the orientation direction thereof is oriented in a direction along the root portion 200 by the above-mentioned flows 400a to 400f of the resin. There is concern that cracks may occur in the root portion 200 in the direction along the root portion 200 due to force applied to the root portion 200 when rotating the propeller fan 101. However, when the occurrence direction of the cracks is equal to the orientation direction of the continuous fiber 300, strength of the force applied to the root portion 200 is degraded. Thus, when rotating the propeller fan 101, the blade 103 might break in the root portion 200 at a relatively low revolution number (for example, 2,500 rpm).

CITATION LIST

Patent Literature

Patent Literature 1: Japanese Patent No. 3928380 (pages 2 to 3, FIGS. 3 to 8)

SUMMARY

Technical Problem

The present invention has been made to solve the above-mentioned problems, and an object thereof is to provide a propeller fan in which a root portion of a blade does not break even if strength of the root portion of the blade is raised so as to rotate the root portion at a higher revolution number, and a manufacturing method thereof.

Solution To Problem

In order to solve the afore-mentioned problems, a propeller fan molded by injection molding using a resin material containing a continuous fiber includes, a hub having an end surface wall and a peripheral wall, and a plurality of blades on an outer periphery of the hub. The propeller fan is molded by providing a plurality of injection positions for injecting the resin material containing the continuous fiber in a part of the end surface wall corresponding to a root portion of one of the blades of the hub. A flow direction of the resin material containing the continuous fiber is regulated by the flow of the resin material from the injection positions adjacent to each other, and is in a direction perpendicular to a width direction of the root portion of the blade.

The plurality of injection positions is dispersed and placed in a circumferential direction around a rotation center of the propeller fan. The plurality of injection positions is dispersed and placed on the same circumference around the rotation center of the propeller fan.

In order to solve the afore-mentioned problems, a method of manufacturing a propeller fan includes molding the propeller fan containing a hub having an end surface wall and a peripheral wall, and a plurality of blades on an outer periphery of the hub, and using a metal mold containing a cavity and a runner connected to the cavity via a gate and serving as an injection passage of a molten resin having a continuous fiber, by injecting the molten resin into the cavity through the runner. The plurality of gates is set at a part of the end surface wall corresponding to a root portion of the blade of the propeller fan in the cavity.

Advantageous Effects of Invention

According to the propeller fan and the manufacturing method thereof of the present invention, a plurality of gates is set into a metal mold so that a plurality of injection positions is included for one blade, and the propeller fan is manufactured by the injection molding. Accordingly, the molten resin flows in a direction perpendicular to the width direction of the root portion in the root portion of the blade, and an orientation direction of a continuous fiber contained in the molten resin is also perpendicular to the width direction of the root portion. Thus, it is possible to provide a propeller fan in which strength of the root portion of the blade is improved, and durability is further increased.

DESCRIPTION OF EMBODIMENTS

Hereinafter, an embodiment of the present invention will be described in detail based on the accompanying drawings. Furthermore, in the embodiment, a propeller fan provided in an outdoor unit of an air conditioner will be described as an example. Furthermore, the present invention is not limited to the embodiment mentioned below and can be variously modified within a scope that does not depart from the gist of the present invention.

EXAMPLE

Figure 1A:
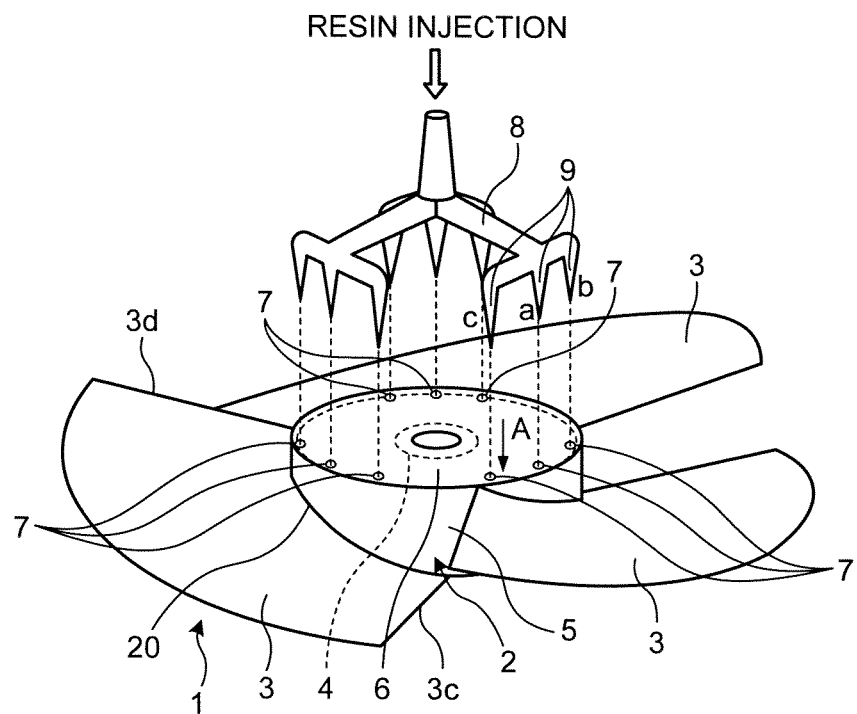
FIG. 1A is a perspective view of a propeller fan manufactured by a manufacturing method according to the present invention.
Figure 1B:
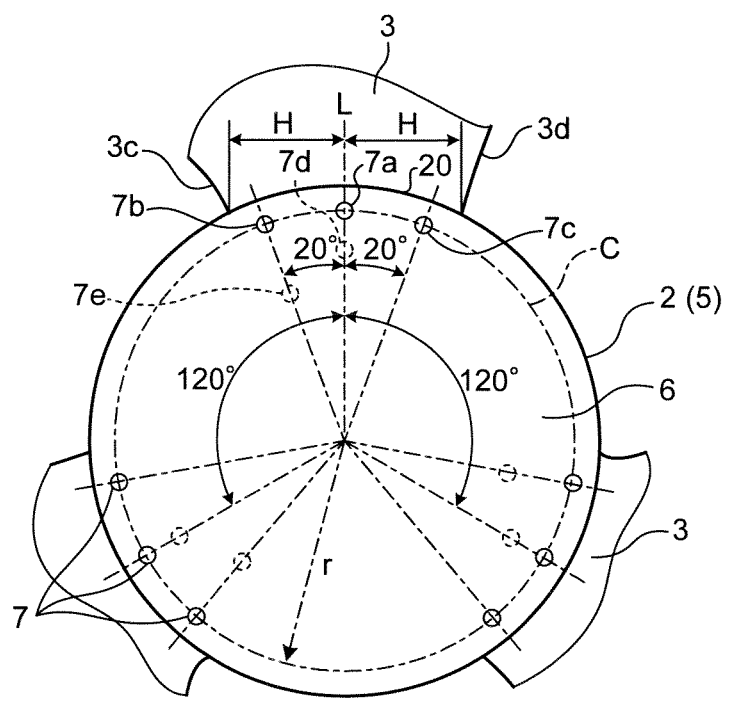
FIG. 1B is a view taken in a direction of an arrow A of the propeller fan in FIG. 1A.

FIG. 1A is a perspective view of a propeller fan manufactured by a manufacturing method related to the present invention, and FIG. 1B is a view taken in a direction of an arrow A of the propeller fan in FIG. 1A. A propeller fan 1 is formed, using a fiber reinforced plastic (FRP) in which a thermoplastic resin such as an acryl resin and a polystyrene resin is mixed with a continuous fiber (length of 0.2 to 0.5 mm) having a needle-like shape and a strip-like shape such as a glass fiber, a carbon fiber and talc at a predetermined ratio (for example, 10 to 40 weight %), through the injection molding by setting molding conditions such as an injection pressure and a metal mold temperature to predetermined values. Furthermore, the continuous fiber is an additive for improving strength of the propeller fan 1, and may be oriented approximately parallel to a flow direction of the thermoplastic resin becoming to a molten state at the time of the injection molding.

Figure 4:
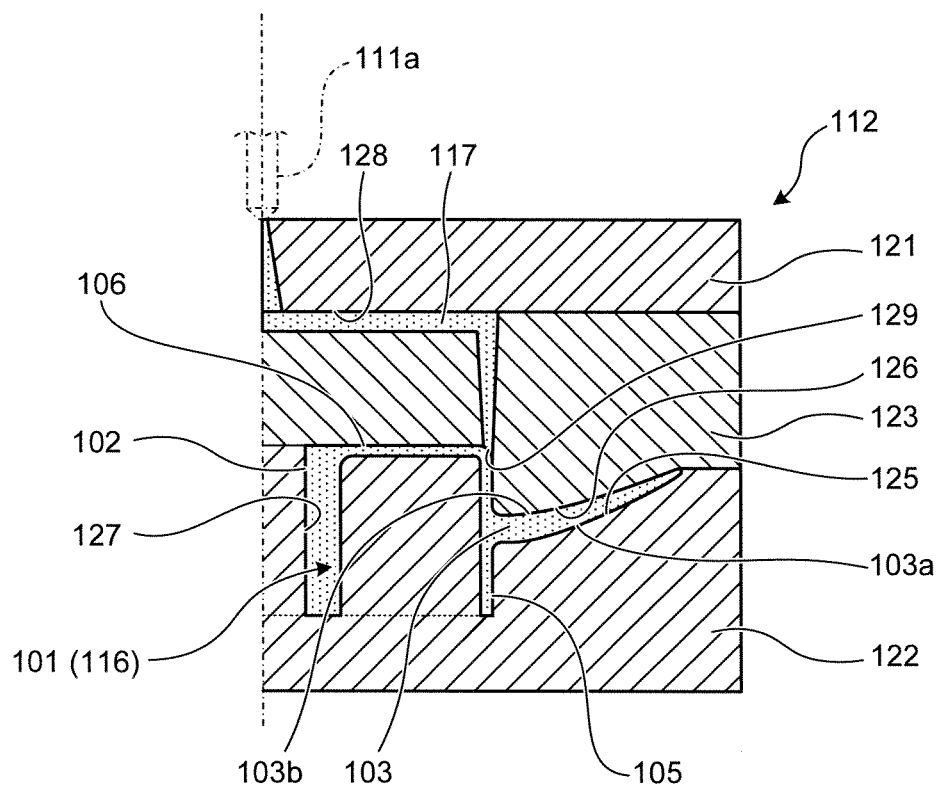
FIG. 4 is a cross-sectional view that illustrates an injection molding state of the propeller fan according to the manufacturing method of the related art.
Figure 5:
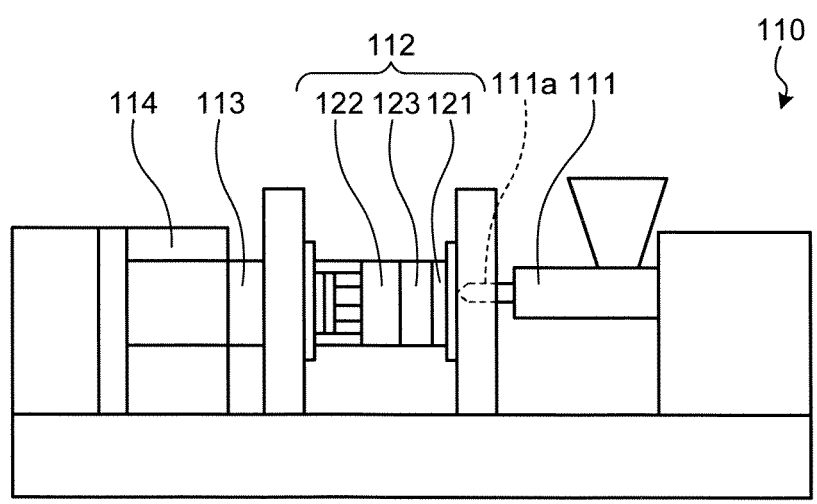
FIG. 5 is a general view of an injection molding machine.
Figure 6:
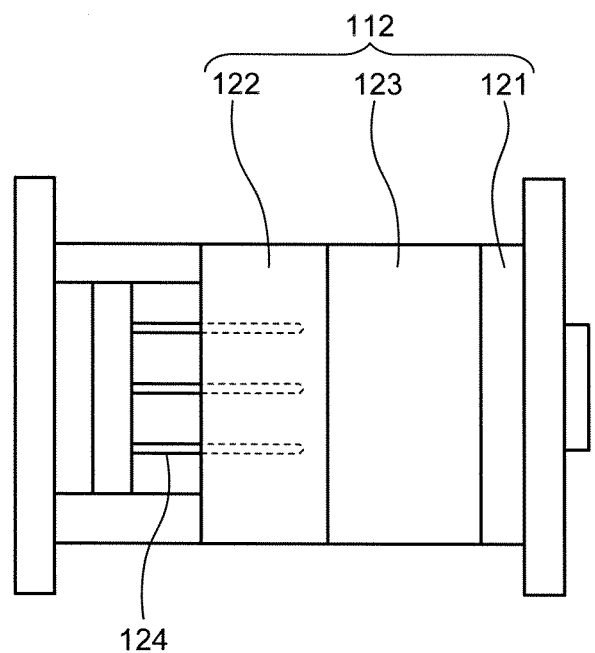
FIG. 6 is a view that illustrates an injection molding state of a metal mold.
Figure 7:
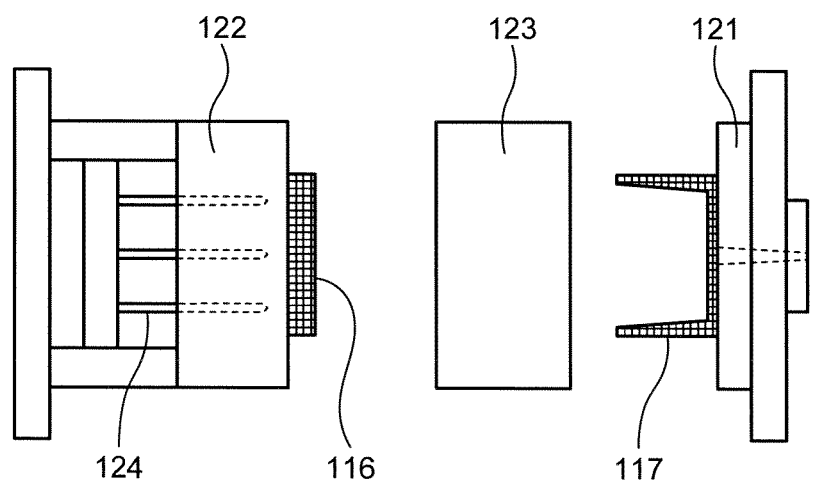
FIG. 7 is a view that illustrates a mold opening state of the metal mold.
Figure 8:
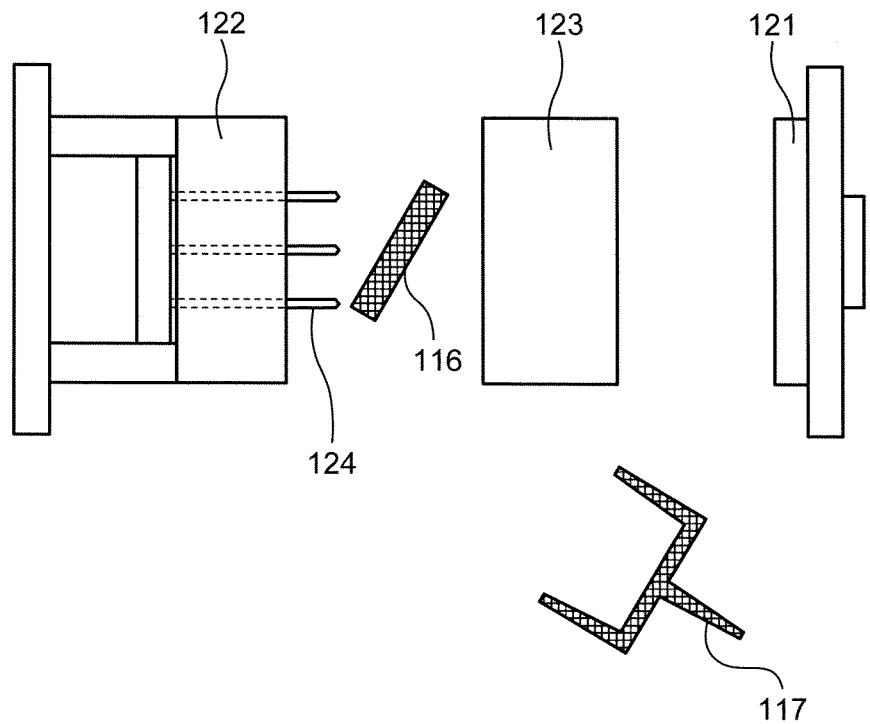
FIG. 8 is a view that illustrates a mold release state of a molded article from the metal mold.

As illustrated in FIG. 1A, the propeller fan 1 has a peripheral wall 5 and an end surface wall 6. A hub 2 which is approximately cylindrical with a bottom provided with a boss 4 for inserting a driving shaft of a motor, not illustrated, driving the propeller fan 1, and three blades 3 having the same shape integrally attached onto the peripheral wall 5 of the hub 2 are included in the central portion of the end surface wall 6. Furthermore, since the metal mold for manufacturing the propeller fan 1 is the same as a metal mold of the related art illustrated in FIG. 4 except for a runner shape and an injection position described later, the detailed description thereof will be omitted. Furthermore, since the injection molding machine used for the injection molding of the propeller fan 1, and the molding machining sequence using the metal mold are the same as the injection molding machine and the molding machining sequence of the related art illustrated in FIGS. 5 to 8, the detailed descriptions thereof will be omitted.

Between a stationary mold and an intermediate metal mold, not illustrated, of the metal mold for manufacturing the propeller fan 1, a runner 8 for supplying the molten resin injected from the injection molding machine illustrated in FIG. 1A into a cavity is formed. The runner 8 has a three-pronged branched road shape corresponding to the number (three) of the blades 3 of the propeller fan 1, a downstream end of each branched road is further branched into three branched roads, and a leading end thereof becomes a gate 9 (a center thereof is 9a, a leading edge 3c side of the blade 3 is 9b, and a trailing edge 3d side of the blade 3 is 9c).

A runner portion, not illustrated, formed by the molten resin supplied to the runner 8 is integrally connected to the propeller fan 1 by each gate 9. As illustrated in FIGS. 1A and 1B, the cutting trace with the runner portion, that is, a gate marks 7 serving as the injection positions of three locations with respect to one blade 3 remains on the end surface wall 6 of the propeller fan 1 after the molding.

As illustrated in FIG. 1B, the gate marks 7 of three locations are located at positions (on a straight line L passing through a central portion of the root portion 20 in the width direction from a rotation center of the propeller fan 1) of each size H from a right end (the trailing edge 3d side) and a left end (the leading edge 3c side) of the root portion 20 with respect to the width direction of the root portion 20 in the peripheral wall 5 of the blade 3 so that a central gate mark 7a is placed on a circumference C around the rotation center of the propeller fan 1, and left and right gate marks 7b and 7c are each placed at positions each rotated by 20° to the left side and the right side around the rotation center of the propeller fan 1 from the gate mark 7a, and on the circumference C around the rotation center of the propeller fan 1. Furthermore, the root portion 20 may be provided with a curve surface having a predetermined radius of curvature (for example, 3 mm) at the positive pressure surface side and/or the negative pressure surface side of the blade 3 so as to cause the molten resin to easily flow, and so as to increase strength.

Furthermore, as illustrated in FIG. 1B, since the blade 3 is configured so that an angle between the adjacent blades 3 is placed at an interval of 120° around the rotation center of the propeller fan 1, the gate marks 7 (7a, 7b and 7c) of three locations corresponding to each blade 3 are also each placed at an interval of 120° as in the blade 3. Furthermore, the respective gates 9a, 9b and 9c are provided in the metal mold so as to be located at positions each corresponding to the gate marks 7a, 7b and 7c.

Next, effects of the propeller fan 1 manufactured by the manufacturing method related to the present invention will be described using FIGS. 1A, 1B and 2. As mentioned above, on the end surface wall 6 of the propeller fan 1, three gates 9 are provided for one blade 3. The gate 9 is a joining portion with a runner portion, not illustrated, and when performing the injection molding of the propeller fan 1, the molten resin flows into the cavity of a metal mold, not illustrated, of the propeller fan 1 from the gate 9.

Figure 3:
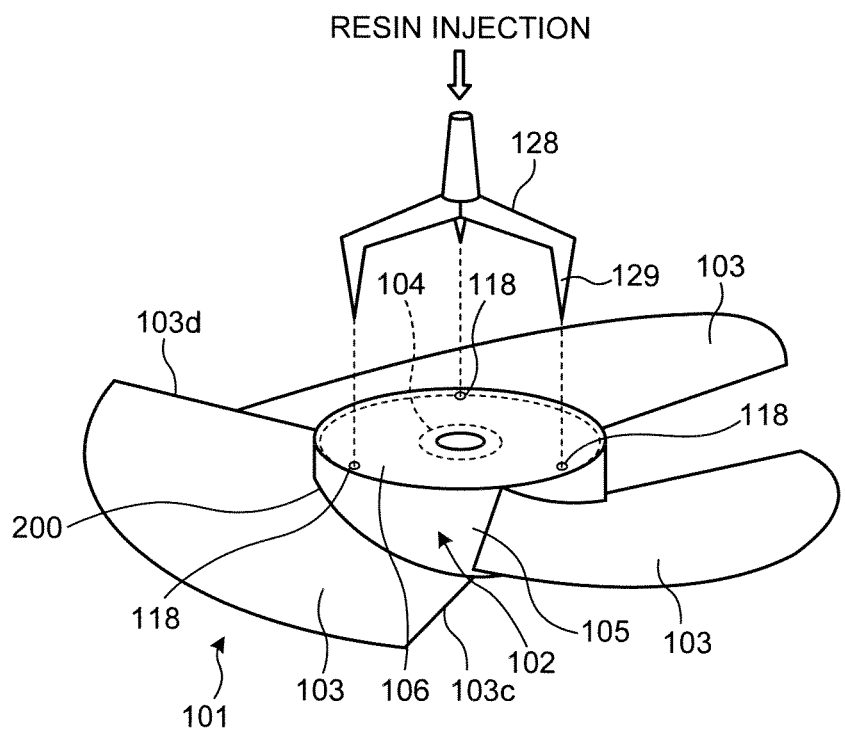
FIG. 3 is a perspective view of the propeller fan manufactured by the manufacturing method of the related art.
Figure 9:
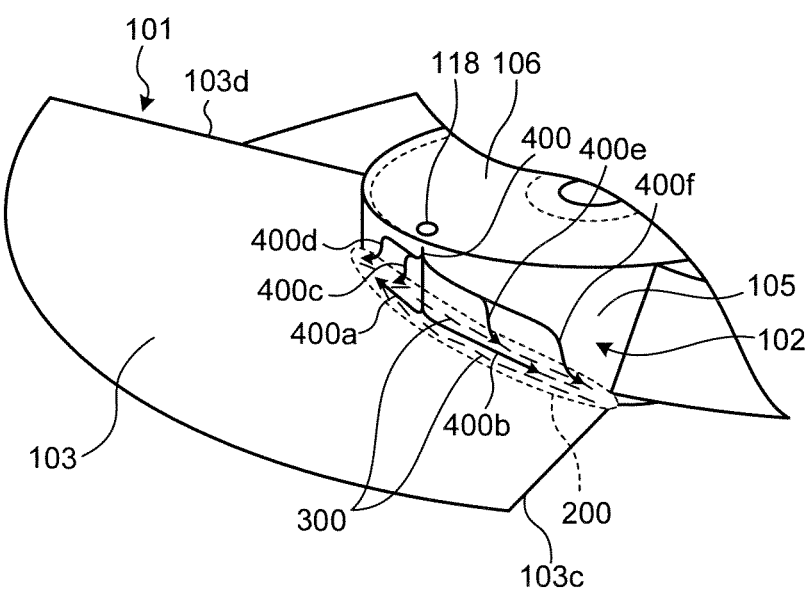
FIG. 9 is a view that illustrates a state of the root portion of the blade of the propeller fan according to the manufacturing method of the related art.

In the manufacturing method of the propeller fan of the related art, as mentioned above using FIGS. 3 and 9, since there is one gate for each blade, the continuous fiber contained in the molten resin in the root portion of the blade is oriented parallel to the root portion, and thus the root portion might break at a relatively low revolution number (for example, 2500 rpm) due to strength of the root portion declining.

Figure 2:
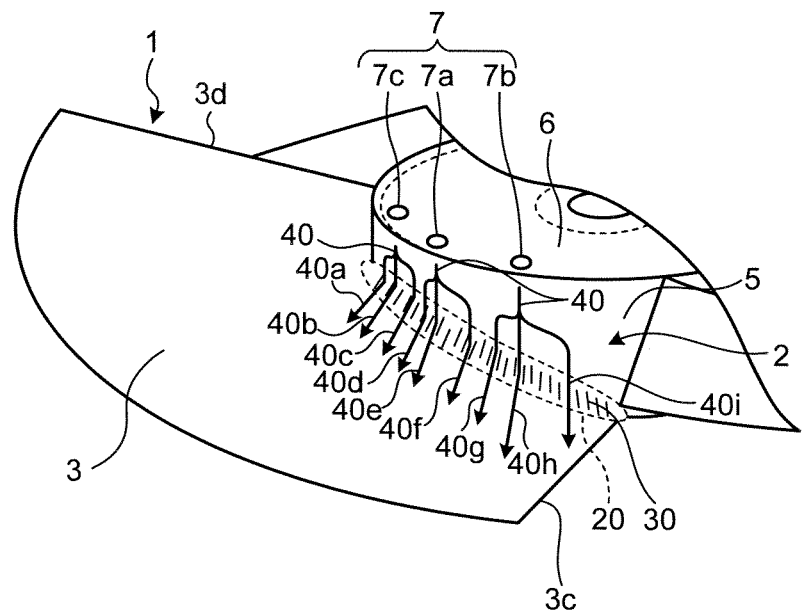
FIG. 2 is a view that illustrates a state of a root portion of a blade of the propeller fan according to the manufacturing method of the present invention.

On the contrary, in the manufacturing method of the propeller fan of the present invention, since three gates 9 are provided for each blade 3, as illustrated in FIG. 2, the molten resin flows toward the root portion 20 along the peripheral wall 5 (cavity corresponding thereto) from the gates 9 of the three locations in the same course as the flow of the resin indicated by reference numeral 40.

Specifically, the molten resin that flowed in the cavity from the three gates 9 flows so as to radially spread from each gate 9, and flows like the flows 40 (40a to 40i) of the resin illustrated in FIG. 2. Although the blade 3 is joined to the peripheral wall 5 of the hub 2 by the root portion 20, the thickness from the root portion 20 to the leading end portion of the blade 3 becomes thinner toward the leading end portion of the blade 3 from the root portion 20.

The molten resin that flowed from the gate 9 (the gate mark 7) and reached the root portion 20 tries to flow in a direction along the root portion 20 having a wide cross-sectional area before flowing in a direction of the blade 3 having a narrow cross-sectional area. However, since the molten resin that flowed into the cavity from the respective gates 9a to 9c (the gate marks 7a to 7c) and reached the root portion 20, in order to reach the root portion 20 at almost the same timing, the flows 40a to 40i of the resin each regulate the flow direction thereof, and thus the flows 40a to 40i of the resin becomes directions perpendicular to the root portion 20.

Since the molten resin is a fiber reinforced plastic, the molten resin contains a continuous fiber 30. However, since the orientation direction of the continuous fiber 30 is parallel to the flow of the resin, as illustrated in FIG. 2, the continuous fiber 30 is oriented in a direction perpendicular to the width direction of the root portion 20 along the flow of the molten resin. Although there is concern that cracks may occur in the root portion 20 in a direction along the root portion 20 due to force applied to the root portion 20 when rotating the propeller fan 1, in the present embodiment, the direction of the crack is perpendicular to the orientation direction of the continuous fiber 30. Thus, strength of the force applied to the root portion 20 is improved, and even when rotating the propeller fan 1 at a higher revolution number (for example, 3500 rpm), the root portion 20 does not break.

Although a case of providing the three gates 9 has been described in the above-mentioned embodiment, the number of the gate may be two or greater than or equal to four. However, when describing a position of the corresponding gate mark, there is a need to disperse and place the plurality of gates on left and right sides on the boundary of the straight line L (the central portion of the root portion 20) of FIG. 1B. Furthermore, a case has been described where three gates 9 are dispersed and placed on the same circumference around the rotation center of the propeller fan 1. However, if another gate is not placed on the straight line that connects one gate (the gate mark corresponding thereto) with the rotation center, as illustrated in FIG. 1B, for example, the gate mark 7a may be placed with a gate mark 7d located at a position close to the rotation center with respect to the gate mark 7c, and the gate mark 7b may be placed with a gate mark 7e located at a position close to the rotation center with respect to the gate mark 7d.

As mentioned above, according to the propeller fan and the manufacturing method thereof of the present invention, since a plurality of gates is set into the metal mold so as to include a plurality of injection positions in one blade, and the propeller fan is manufactured by the injection molding, the molten resin flows in a direction perpendicular to the width direction of the root portion in the root portion of the blade, and the orientation direction of the continuous fiber contained in the molten resin is also perpendicular to the width direction of the root portion. Thus, it is possible to provide a propeller fan in which strength of the root portion of the blade is improved, and durability is further improved.

REFERENCE SIGNS LIST 1 propeller fan
2 hub
3 blade
3c leading edge
3d trailing edge
4 boss
5 peripheral wall
6 end surface wall
7, 7a to 7e gate mark
8 runner portion
8a distribution portion
9, 9a to 9c gate
20 root portion
30 continuous fiber
40, 40a to 40i flow of the resin

The invention claimed is:
1. A method of manufacturing a propeller fan comprising:
molding the propeller fan including a hub having an end surface wall and a peripheral wall, and a plurality of blades on an outer periphery of the hub, using a metal mold including a cavity and a runner connected to the cavity via a gate and serving as an injection passage of a molten resin containing a continuous fiber, by injecting the molten resin into the cavity through the runner,
wherein the plurality of gates is set at a part of the end surface wall corresponding to a root portion of the blade of the propeller fan in the cavity, and
wherein the plurality of injection positions is provided so that a flow direction of the resin material containing the continuous fiber in the root portion of the one blade of the hub is regulated by the flow of the resin material from the injection positions adjacent to each other, and is in a direction perpendicular to a width direction of the root portion of the blade.

* * * * *